(12) United States Patent
Choi et al.

(10) Patent No.: US 7,939,702 B2
(45) Date of Patent: May 10, 2011

(54) PROCESS FOR INCREASING PRODUCTION OF LIGHT OLEFINS FROM HYDROCARBON FEEDSTOCK IN CATALYTIC CRACKING

(75) Inventors: Sun Choi, Daejeon (KR); Yong Seung Kim, Daejeon (KR); Deuk Soo Park, Gyeonggi-do (KR); Suk Joon Kim, Daejeon (KR); Il Mo Yang, Seoul (KR)

(73) Assignee: SK Energy Co., Ltd., Seoul (KR)

( * ) Notice: Subject to any disclaimer, the term of this patent is extended or adjusted under 35 U.S.C. 154(b) by 397 days.

(21) Appl. No.: 11/421,496

(22) Filed: Jun. 1, 2006

(65) Prior Publication Data
US 2007/0083071 A1    Apr. 12, 2007

(30) Foreign Application Priority Data

Oct. 7, 2005    (KR) .................. 10-2005-0094467

(51) Int. Cl.
*C07C 4/02* (2006.01)
(52) U.S. Cl. ........ 585/649; 585/650; 585/651; 585/652; 585/653; 585/648

(58) Field of Classification Search ........... 585/649–653
See application file for complete search history.

(56) References Cited

U.S. PATENT DOCUMENTS

| | | | |
|---|---|---|---|
| 6,307,117 B1 * | 10/2001 | Tsunoda et al. | 585/651 |
| 6,441,263 B1 * | 8/2002 | O'Rear et al. | 585/650 |
| 6,576,805 B2 | 6/2003 | Keady et al. | |
| 6,602,920 B2 | 8/2003 | Hall et al. | |
| 2001/0044565 A1 | 11/2001 | Keady et al. | |
| 2002/0169350 A1 * | 11/2002 | Steffens et al. | 585/648 |
| 2003/0225306 A1 | 12/2003 | Boelt et al. | |

OTHER PUBLICATIONS 4-page translation of Russia Office Action dated Mar. 1, 2010.

* cited by examiner

*Primary Examiner* — Tam M Nguyen
(74) *Attorney, Agent, or Firm* — McDermott Will & Emery LLP

(57) ABSTRACT

Disclosed is a process for increasing production of light olefinic hydrocarbons from hydrocarbon feedstock by catalytic cracking. In the process, an effective separation process structure and recycle method of light olefins are used not only to increase the productivity and efficiency of an overall process, thus effectively increasing the production of light olefins, but also to simplify the overall process.

11 Claims, 2 Drawing Sheets

PROCESS FOR INCREASING PRODUCTION OF LIGHT OLEFINS FROM HYDROCARBON FEEDSTOCK IN CATALYTIC CRACKING

BACKGROUND OF THE INVENTION

1. Field of the Invention

The present invention relates to a process for increasing production of light olefinic hydrocarbons from hydrocarbon feedstock by catalytic cracking, and more particularly to a process for increasing production of light olefinic hydrocarbons from hydrocarbon feedstock by catalytic cracking, which can increase the production of ethylene and propylene in an overall process by recycling ethane, propane and a C4-C5 fraction and variably controlling the production pathway of a C6+ fraction.

2. Description of the Related Art

Light olefins, such as ethylene and propylene, are widely used in the petroleum chemical industry. These light olefins are generally produced by the thermal cracking (steam cracking) of naphtha in the presence of steam. The reaction in the steam cracking technology is carried out at a high reaction temperature of 800-900° C. in a short residence time. Generally, by the steam cracking technology, produces various kinds of olefins which have a composition determined with a limited range.

Typical products of the steam cracking technology are ethylene and propylene, and, according to the circumstances of a process, a C4 olefin component is produced as a byproduct. However, the C4 olefin component consists of various isomers which requires a multistage complex separation process for the production thereof. Also, olefins having 5 carbon atoms or more have low economic value, and thus, are converted to saturated hydrocarbons by hydrogenation. In the steam cracking technology, the recycling of olefin components of 4 carbon atoms or more to a thermal cracking reactor entails no economic advantage because it causes a coke problem that shortens the production cycle of a process.

FIG. 1 shows a process diagram showing a process for producing light olefinic hydrocarbons from hydrocarbon feedstock by steam cracking (i.e., thermal cracking) according to the prior art.

As shown in FIG. 1, in the steam cracking process, heavy naphtha feedstock 31 is generally fed together with steam 32, acting as an aid, into a high-temperature thermal cracking reactor 1 where the feedstock is converted to a reaction product 33 containing olefins. The reaction product 33 is fed into a quench tower 2 where it is primarily separated, according to boiling point into, in the order of higher boiling point, fuel oil 37, pyrolysis gasoline 36 containing C5+ hydrocarbons as main components, dilution water 35 resulting from the condensation of steam used as a reaction aid, and gaseous product 34 containing C4− hydrocarbons as main components. The gaseous product 34 is passed through a compressor 3 and finally fed into a demethanizer 7, during which it is passed through unit processes, such as a splitter 4 and a low-temperature heat exchanger 5, in order to recover heat. Hydrogen and methane, which have the lowest boiling points in the overall process, are produced as a fraction 42. In a deethanizer 8, a C2 fraction 47 is separated to the top, and the C2 fraction is passed through a C2 hydrogenation reactor 9 and fed into a C2 splitter 10 where it is separated into ethane 49 and ethylene 50. The ethane 49 is partially converted to heavy olefins 51 in a recycling furnace 11 and then recycled to the quench tower 2. In a depropanizer 12, a C3 fraction 53 is separated to the top, and the C3 fraction is passed through C3 hydrogenation reactor 13 and fed into a C3 splitter 14 where it is separated into propane 55 and propylene 56. In a debutanizer 15, a C4 fraction 58 is separated to the top, and the C4 fraction is passed through a butadiene extraction unit 16, and MTBE (methyl tertiary butyl ether) unit 17, a C3 hydrogenation reactor 18, and a C4 splitter 19, during which it is separated into a butadiene 59, isobutylene 61, 1-butene 65, and C4 LPG 64, respectively. In a depentanizer 20, a C5 fraction 66 is separated to the top, and the C5 fraction is passed through a C5 hydrogenation reactor 21 to produce C5 LPG 67. In a deoctanizer 22, a C6-C8 fraction 69 is separated to the top, and the C6-C8 fraction is passed through a PGHT (pyrolysis gasoline hydrotreating unit) 23 to produce an aromatic fraction 70. In the bottom of the deoctanizer 22, a C9+ fraction 68 is produced.

Also, by a fluid catalytic cracking (FCC) process which is used to increase the added value of high-boiling point fractions in oil refining plants and produces gasoline as a main product, light olefinic hydrocarbons can be produced as byproducts. This FCC process is widely known in the art as catalytic cracking technology using a catalyst in the form of fine particles, which behaves like fluid when treated with steam. In the FCC process, a heavier fraction than naphtha or kerosene used in the present invention, such as vacuum residue, atmospheric residue or gaseous oil, is used as feedstock, and gasoline is mainly produced, rather than light olefins, and thus, light olefins are not effectively produced.

Typical chemical processes of producing these light olefins, such as ethylene and propylene, include steam cracking processes, FCC processes, and process for the catalytic cracking of light fractions. The typical compositions of reaction products from these processes are shown in Table 1.

TABLE 1

|  | Reaction product from steam cracking process | Reaction product from FCC process | Reaction product from process for catalytic cracking of light fractions |
| --- | --- | --- | --- |
| Methane | 16.13 | 1.2 | 13.91 |
| Ethylene | 32.05 | 1.9 | 20.71 |
| Ethane | 2.91 | 0.7 | 8.93 |
| Propylene | 16.65 | 4.8 | 22.06 |
| Propylene | 0.35 | 0.7 | 3.04 |
| C4 | 10.94 | 9.1 | 8.97 |
| C5 | 5.71 | 1.1 | 7.81 |
| C6 or more | 14.18 | 79.6 | 13.58 |
| Others | 1.08 | 0.9 | 0.99 |

The prior art relating to the light fraction-catalytic cracking processes of producing light olefinic hydrocarbons from hydrocarbon feedstock, and preferably naphtha or kerosene feedstock, by catalytic cracking, will now be described.

U.S. Pat. No. 6,307,117 discloses a method for separating a catalytic cracking product into an H2/C3 fraction and a C4+ fraction. Also disclosed is a method for separating the C4+ fraction into a C4 fraction, a C5-C8 fraction and a C9+ fraction. Also, a method for additionally cracking the C4+ fraction in a steam cracking reactor is disclosed. However, these methods cannot make the effective utilization of reaction products with sufficient consideration to the characteristics of the catalytic cracking reaction.

U.S. Pat. No. 6,576,805 discloses a process for recovering an H2/C3 fraction in a catalytic cracking process, but fails to suggest a process structure for an overall reaction product, and particularly, fails to suggest the effective utilization of a C4+ fraction.

U.S. Pat. No. 6,602,920 discloses a process structure of sequentially using thermal cracking, hydrogenation and catalytic cracking steps to produce light olefins from natural gas feedstock. However, this process structure cannot be used in the inventive catalytic cracking process that uses hydrocarbon feedstock, and preferably naphtha or kerosene feedstock.

As described above, although the development of catalysts for the light fraction-catalytic cracking processes for producing light olefinic hydrocarbons from hydrocarbon feedstock, and preferably naphtha or kerosene, by catalytic cracking, has been actively made, there has been no suggestion of an effective process structure for producing light olefins.

SUMMARY OF THE INVENTION

The present inventors have developed a separation process structure and method of recycling light olefins effective for use in processes for producing light olefinic hydrocarbons from hydrocarbon feedstock by catalytic cracking and could effectively increase the production of light olefins by the use of the developed process structure and method. On the basis of this fact, the present invention has been completed.

Accordingly, it is an object of the present invention to provide a process for increasing production of light olefinic hydrocarbons from hydrocarbon feedstock, and more preferably, naphtha or kerosene feedstock, by catalytic cracking, which can effectively increase the production of ethylene and propylene in an overall process by effectively recycling ethane and propane, having low added value, recycling a C4-C5 fraction in the most economic manner, and variably controlling the production pathway of a C6+ fraction. Another object of the present invention is to provide a process for increasing production of light olefinic hydrocarbons from hydrocarbon feedstock by catalytic cracking, which can increase the economic efficiency of an overall process by minimizing separation processes and hydrogenation reactions.

To achieve the above and other objects, the present invention provides a process for increasing production of olefinic hydrocarbons from hydrocarbon feedstock by catalytic cracking, the process comprising the steps of: (a) feeding hydrocarbon feedstock and steam into a catalytic cracking furnace where the hydrocarbon feedstock is subjected to a catalytic cracking reaction in the presence of a catalyst; (b) regenerating the catalyst used in the catalytic cracking reaction by a continuous or periodic regeneration procedure and recycling the regenerated catalyst into the catalytic cracking furnace; (c) quenching, compressing and separating the product of the catalytic cracking reaction, to separate and recover each of hydrogen, methane and C2-C3 olefinic hydrocarbons and to separate a stream containing C2-C3 paraffinic hydrocarbons and a stream containing C4+ hydrocarbons; (d) feeding the stream containing C2-C3 paraffinic hydrocarbons into a recycling furnace where it is converted to C2-C3 olefinic hydrocarbons by thermal cracking reaction, and recycling the C2-C3 olefinic hydrocarbons to the quenching step; and (e) recycling at least a portion of the stream containing C4+ hydrocarbon to the catalytic cracking reaction step, the catalyst regeneration step or both steps.

In the inventive method, the stream containing C4+ hydrocarbons can be separated into a stream containing C4-C5 hydrocarbons and a stream containing C6+ hydrocarbons.

The stream containing C4-C5 hydrocarbons can be recycled to the catalytic cracking reaction step. Meanwhile, a portion of the stream containing C6+ hydrocarbons is recycled to the catalytic cracking reaction step, and the remaining portion can be separated into a stream containing C6-C8 hydrocarbons and a stream containing C9+ hydrocarbons by the separation process.

A portion of the stream containing C6-C8 hydrocarbons can be recycled to the catalytic cracking reaction step, and the remaining portion can be recovered after conversion to an aromatic fraction by hydrodesulfurization.

Meanwhile, a portion of the stream containing C9+ hydrocarbons is recycled to the catalytic cracking reaction, and the remaining portion can be recycled to the catalyst regeneration step.

The hydrocarbon feedstock can be naphtha or kerosene.

Preferably, the hydrocarbon feedstock is a hydrocarbon mixture with a boiling point of 30-350° C.

The catalyst can be a zeolite compound.

Preferably, the zeolite compound is ZSM-5 zeolite.

The catalytic cracking reaction is preferably carried out at a temperature of 500-750° C. and a hydrocarbon feedstock/steam weight ratio of 0.01-10.

Also, the catalytic cracking reaction can be carried out in a fixed-bed reactor or a fluidized-bed reactor.

If the catalytic cracking reaction is carried out in the fixed-bed reactor, the catalytic cracking reaction can be carried out at a hydrocarbon feedstock residence time of 0.1-600 seconds.

If the catalytic cracking reaction is carried out in the fluidized-bed reactor, the catalytic cracking reaction can be carried out at a hydrocarbon feedstock residence time of 0.1-600 seconds and a catalyst/hydrocarbon feedstock weight ratio of 1-100.

DESCRIPTION OF THE PREFERRED EMBODIMENTS

Figure 2:
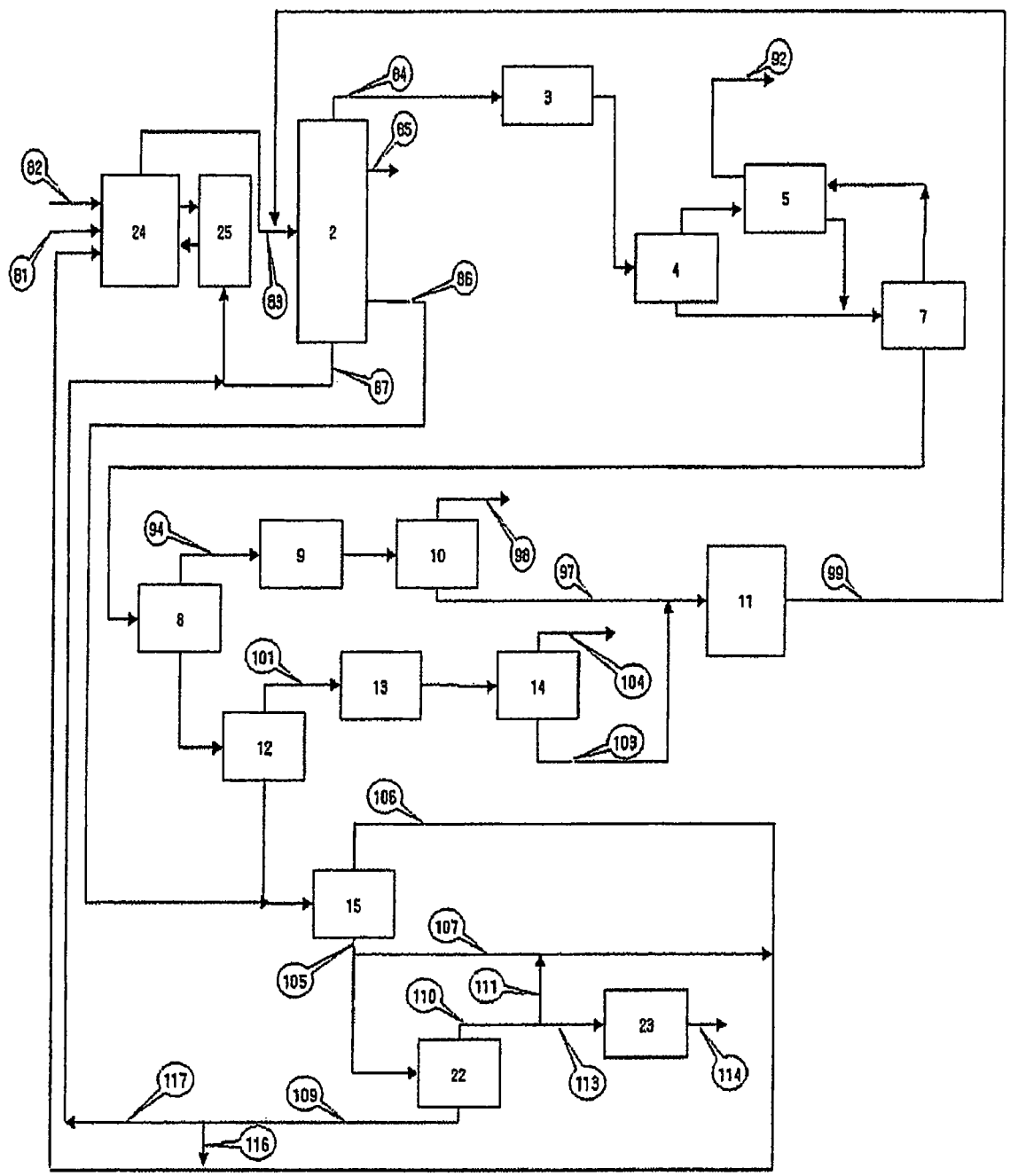
FIG. 2 is a process diagram showing an embodiment for producing light olefinic hydrocarbons from hydrocarbon feedstock by catalytic cracking according to the present invention.

Hereinafter, a preferred embodiment of the present invention will be described in more detail with reference to FIG. 2, but the scope of the present invention is not limited thereto.

In the process according to the present invention, hydrocarbon feedstock 81, preferably naphtha or kerosene feedstock, and more preferably a hydrocarbon feedstock with a boiling point of 30-350° C., is fed into a catalytic cracking reactor 24 together with steam 82 for maintaining smooth catalyst fluidization and improving reactivity. In the catalytic cracking reactor 24, the feedstock is converted into a reaction product 83 by a cracking reaction. In this regard, the flow of the steam 82 is the sum of a flow for maintaining smooth catalyst fluidization and a flow for improving reactivity, which is optimized according to reaction conditions.

As the catalyst, any catalyst may be used without specific limitation if it is one known in the art, but it is preferable to use a Zeolite compound, and more preferably ZSM-5 zeolite.

The catalytic cracking reaction greatly depends on the reaction temperature, space velocity, hydrocarbon/steam weight ratio, etc. These reaction conditions need to be determined with the following considerations: the lowest possible temperature to minimize energy consumption, the optimal conversion, the optimal olefin production, the minimization of catalyst deactivation caused by coke production, etc.

According to a preferred embodiment of the present invention, the catalytic cracking reaction temperature is about 500-

750° C., preferably about 600-700° C., and more preferably about 610-680° C. Also, the hydrocarbon/steam weight ratio is about 0.01-10, preferably about 0.1-2.0, and more preferably about 0.3-1.0.

Also, the catalytic cracking reaction may be carried out in a fixed-bed or fluidized-bed reactor, and the residence time of the hydrocarbon feedstock is about 0.1-600 seconds, preferably about 0.5-120 seconds, and more preferably about 1-20 seconds.

If the fluidized-bed reactor is used, the catalyst/hydrocarbon feedstock weight ratio will be about 1-100, preferably about 5-50, and more preferably about 10-40.

Meanwhile, the catalytic cracking reactor 24 feeds the used catalyst into catalyst regenerator 25 and is fed with a catalyst regenerated by a continuous or periodic procedure in the catalyst regenerator 25. The reaction product 83 is fed into a quench tower 2 where it is primarily separated according to boiling point into, in descending order from highest boiling point, fuel oil 87, pyrolysis gasoline 86, containing C5+ hydrocarbons as main components, dilution water 85, resulting from the condensation of steam used as the reaction aid, and gaseous products 84, containing C4– hydrocarbons as main components. The fuel oil 87, which has low economic value due to its excessively high boiling point, is fed into the catalyst regenerator 25. The gaseous product 84 is passed through a compressor 3 and finally fed into a demethanizer 7, during which it is passed through unit processes, such as a splitter 4 and a low-temperature heat exchanger 5, in order to recover heat. This produces a hydrogen/methane fraction 92, which has the lowest boiling points in the overall process. In the deethanizer 8, a C2 fraction 94 is separated to the top, and the C2 fraction is passed through a C2 hydrogenation reactor 9 and fed into a C2 splitter 10 where it is separated into ethane 97 and ethylene 98. The ethane 97 is partially converted to heavy olefins in a recycling furnace 11 and then is recycled to the quench tower 2 by a line 99. In a depropanizer 12, a C3 fraction 101 is separated to the top, and the C3 fraction is passed through a C3 hydrogenation reactor 13 and fed into a C3 splitter 14 where it is separated into propane 103 and propylene 104. The propane 103 is partially converted to light olefins in the recycling furnace 11 and is recycled to the quench tower 2 by the line 99. In a debutanizer 15, a C4-C5 fraction 106 is separated to the top, a C6+ fraction 105 is separated to the bottom, and the C4-C5 fraction 106 is partially recycled into the catalytic cracking reactor 24 along with a recycled C6+ fraction 107 according to the purpose of the process. In a deoctanizer 22, a C6-C8 fraction 110 is separated to the top, and a portion of the C6-C8 fraction is recycled into the catalytic cracking reactor 24 as a recycled C6-C8 fraction 111 according to the purpose of the process, and the remaining portion 113 is passed through a PGHT 23 to produce an aromatic fraction 114. A portion of a C9+ fraction 109 separated from the bottom of the deoctanizer 22 is recycled into the catalytic cracking reactor 24 as a recycled C9+ fraction 116 according to the purpose of the process, and the remaining portion 117 is fed into the catalyst regenerator 25.

As described above, according to the present invention, the production of light olefins in an overall process can be effectively increased by using the separation process structure and method of recycling light olefins, which are effective in a process for producing light olefinic hydrocarbons from hydrocarbon feedstock, and preferably naphtha or kerosene feedstock, by catalytic cracking.

In the case of a catalytic cracking reaction, ethane and propane are produced in a larger amount than in the steam cracking process. Thus, if they are recycled in the whole quantity using the recycling furnace, the production of ethylene and propylene can be increased.

Also, because the production of butadiene and 1-butene from the catalytic cracking reaction is remarkably reduced, the separation and production of these compounds have reduced economic efficiency. However, if these compounds are recycled to the catalytic cracking reactor, their conversion into ethylene and propylene becomes possible. In the present invention, by recycling the whole amount of the C4-C5 fraction to the catalytic cracking reactor 24, unnecessary separation processes and expensive hydrogenation reactions can be eliminated to simplify the overall process and to increase the production of ethylene and propylene.

Also, in the present invention, by recycling a portion 111 of the C6-C8 fraction 110 into the catalytic cracking reactor 24, the content of aromatics can be controlled, and ultimately, can be increased.

Moreover, in the present invention, a portion 116 of the C9+ fraction 116 is recycled into the catalytic cracking reactor 24 where it is converted into a C6-C8 fraction, so that the production of aromatics can be increased. Also, the remaining portion of the C9+ fraction 116 can be recycled and used as fuel oil in the catalyst regenerator. Accordingly, the present invention can maximize the productivity of a process with respect to the control of process production and variation in product cost.

Also, in the present invention, the fuel oil 87 is used directly in the catalyst regenerator so that it is possible to simplify equipment for treating fuel oil and to increase economic efficiency. In a general process, the fuel oil 87 is incinerated due to low economic value as a petroleum chemical product or is used as feedstock in a heater. In this case, however, additional costs for transport and storage are incurred, and mixing the fuel oil 87 with other fractions causes a problem.

The present invention can be more clearly understood by the following examples, which are for illustrative purpose only and are not construed to limit the scope of the present invention.

Comparative Example 1

Figure 1:
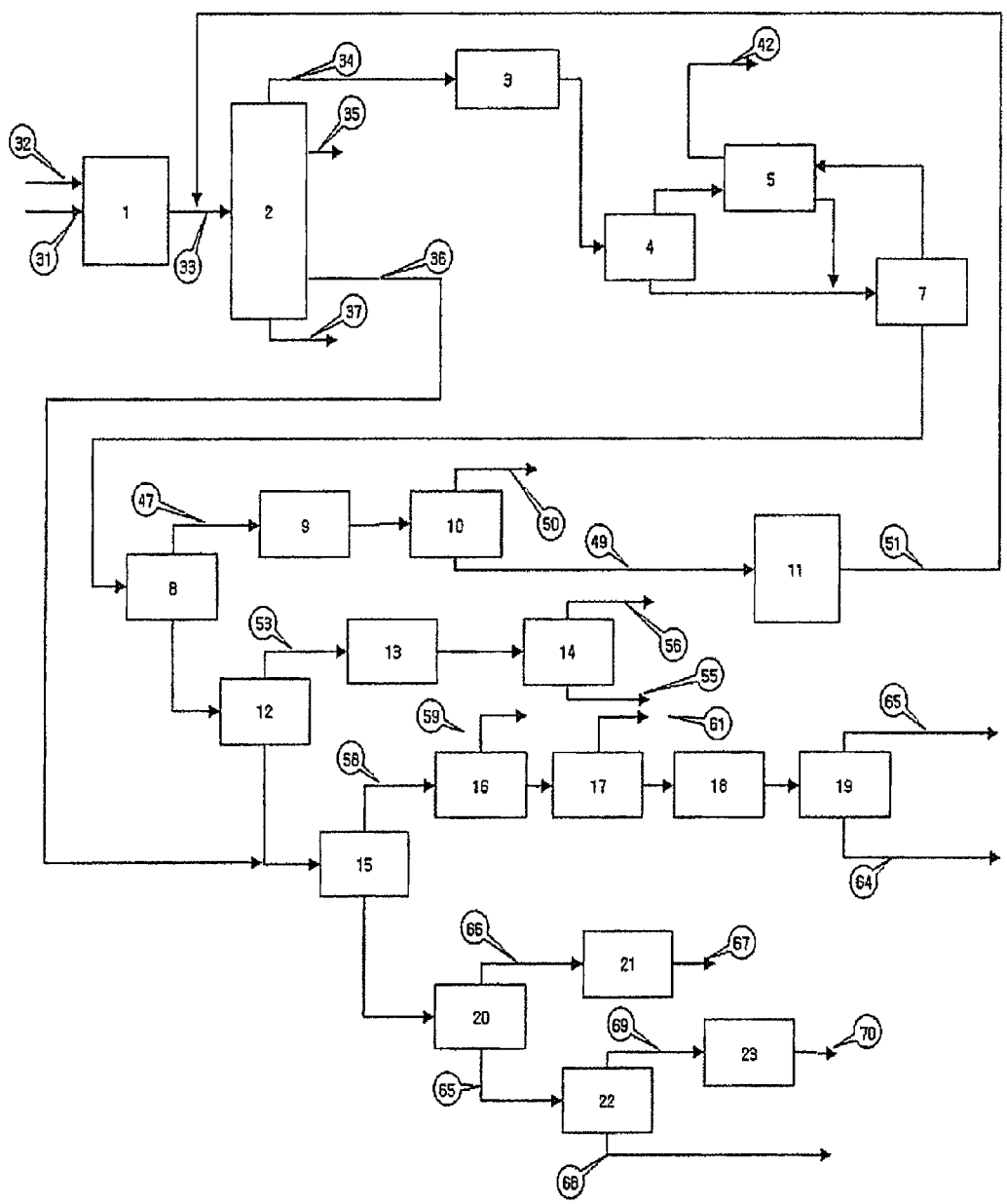
FIG. 1 is a process diagram showing an embodiment for producing light olefinic hydrocarbons from hydrocarbon feedstock by thermal cracking according to the prior art.

The performance of a steam cracking process for producing light olefins was examined by a commercial process with a process structure of FIG. 1, and the results are as follows.

Feedstock used in this Comparative Example 1 is naphtha having a composition shown in Table 2 below.

TABLE 2

|  | n-araffin | i-paraffin | Naphthene | Aromatics |
|---|---|---|---|---|
| Naphtha | 36.2% | 49.3% | 11.3% | 3.2% |

The operation conditions of the thermal cracking reactor 1 are as follows: reaction temperature: 850° C.; steam/naphtha weight ratio: 2; and reaction residence time: 0.1 sec.

The yield of the overall process (including recycled fractions) in this Comparative Example is shown in Table 3 below.

TABLE 3

|  | Composition of reaction product (wt %) |
|---|---|
| Methane | 14.2 |
| Ethylene | 32.8 |

TABLE 3-continued

| | Composition of reaction product (wt %) |
|---|---|
| Ethane | 0.5 |
| Propylene | 17.8 |
| Propane | 1.5 |
| C4 | 10.0 |
| C5 | 4.3 |
| C6 or more | 14.5 |
| Others | 4.4 |

Comparative Example 2

To examine the performance of a catalytic cracking reaction for producing light olefins, a test was performed in a catalytic reactor using the feedstock as described in Comparative Example 1.

The catalytic reactor was fed with the feedstock by a liquid injection pump, and an electric heater outside the reactor was used to control the reaction temperature. The reaction product was separated into a liquid phase and a vapor phase such that the weight and components of each phase could be quantitatively analyzed.

In this Comparative Example, an HZSM-5 catalyst was used and the reaction was carried out at 675° C. The analysis results for the reaction product are shown in Table 4 below.

TABLE 4

| | Composition of reaction product (wt %) |
|---|---|
| Methane | 13.91 |
| Ethylene | 20.71 |
| Ethane | 8.93 |
| Propylene | 22.06 |
| Propane | 3.04 |
| C4 | 8.97 |
| C5 | 7.81 |
| C6 or more | 13.58 |
| Others | 0.99 |

As could be seen in Table 4, significant amounts of ethane and propane were produced, indicating the characteristic of the catalytic cracking reaction, and the C4-C5 fraction was also significantly produced.

Comparative Example 3

To examine the effect of recycling fractions, the reaction product of Comparative Example 2 was separated to produce a C4-C5 fraction having the composition shown in Table 5, and the same catalytic reaction as described in Comparative Example 2 was carried out.

TABLE 5

| | n-paraffin | i-paraffin | Olefins | Naphthene | Aromatics |
|---|---|---|---|---|---|
| C4-C5 fraction | 16.8% | 15.7% | 65.6 | 1.9% | 0% |

Analysis results for a reaction product obtained under the same catalyst and reaction conditions as Comparative Example 2 are shown in Table 6 below.

TABLE 6

| | Composition of reaction product (wt %) |
|---|---|
| Methane | 8.3 |
| Ethylene | 25.0 |
| Ethane | 5.9 |
| Propylene | 25.4 |
| Propane | 4.3 |
| C4 | 13.8 |
| C5 | 5.7 |
| C6 or more | 10.58 |
| Others | 1.02 |

From the results of this Comparative Example, it can be seen that if the C4-C5 fraction is recycled, ethylene and propylene can be effectively produced.

Example 1

Using the results of Comparative Example 3, the performance of the overall process according to the present invention was examined. The overall process performance was examined using computer simulation. Also, the performance of the recycling furnaces using ethane and propane as feedstock was examined using the existing process data, and the results shown in Table 7 below were obtained.

TABLE 7

| | Composition (wt %) of reaction product from recycling furnace using ethane as feedstock | Composition (wt %) of reaction product from recycling furnace using propane as feedstock |
|---|---|---|
| Methane | 4.2 | 18.9 |
| Ethylene | 51.9 | 35.6 |
| Ethane | 34.5 | 2.8 |
| Propylene | 1.2 | 16.7 |
| Propane | 0.1 | 16.3 |
| C4 | 2.3 | 3.7 |
| C5 | 0.3 | 1.1 |
| C6 or more | 1.1 | 1.6 |
| Others | 4.4 | 3.3 |

The overall process yield is as shown in Table 8 below.

TABLE 8

| | Overall process yield (wt %) |
|---|---|
| Methane | 17.3 |
| Ethylene | 34.7 |
| Ethane | 0.0 |
| Propylene | 24.6 |
| Propane | 0.0 |
| C4 | 0.0 |
| C5 | 0.0 |
| C6 or more | 20.5 |
| Others | 2.9 |

As could be seen in Table 8, the production yield of ethylene and propylene was 59.3 wt %, which is much higher than 50.6 wt % in the general steam cracking process of Comparative Example 1. This result was obtained by effectively recycling ethane and propane into the recycle furnace and recycling the C4-C5 fraction into the catalytic cracking reactor.

As described above, the present invention provides a process for producing light olefinic hydrocarbons from hydrocarbon feedstock, and more preferably, naphtha or kerosene feedstock, by catalytic cracking, which can effectively increase the production of ethylene and propylene in the overall process by effectively recycling ethane and propane, having low added value, recycling a C4-C5 fraction in the most economic manner and variably controlling the production pathway of a C6+ fraction.

Also, according to the present invention, separation processes and hydrogenation reactions are minimized, leading to an increase in the economic efficiency of an overall process.

Although the preferred embodiments of the present invention have been described for illustrative purposes, those skilled in the art will appreciate that simple modifications, additions, and substitutions are possible, without departing from the scope and spirit of the invention as disclosed in the accompanying claims.

What is claimed is:

1. A process for increasing production of light olefinic hydrocarbons from hydrocarbon feedstock by catalytic cracking, the process comprising the steps of:
    (a) feeding paraffinic naphtha or kerosene and steam into a catalytic cracking furnace where the naphtha or kerosene is subjected to a catalytic cracking reaction in the presence of a catalyst;
    (b) regenerating the catalyst used in the catalytic cracking reaction by a continuous or periodic regeneration procedure and recycling the regenerated catalyst into the catalytic cracking furnace;
    (c) quenching, compressing and separating the product of the catalytic cracking reaction, to separate and recover each of hydrogen, methane and C2-C3 olefinic hydrocarbons, and to separate a stream containing C2-C3 paraffinic hydrocarbons and a stream containing C4+ hydrocarbons;
    (d) feeding the stream containing C2-C3 paraffinic hydrocarbons into a recycling furnace where it is converted to C2-C3 olefinic hydrocarbons by a thermal cracking reaction, and recycling the converted C2-C3 olefinic hydrocarbons to the quenching step (c); and
    (e) recycling C4-C5 hydrocarbons of the stream containing C4+ hydrocarbon to the catalytic cracking furnace wherein the recycled C4-C5 hydrocarbons are subjected to a catalytic cracking reaction in the presence of a catalyst; and
    (f) optionally recycling C6+ hydrocarbons of the stream containing C4+ hydrocarbon to the catalytic cracking furnace wherein the recycled C6+ hydrocarbons are subjected to a catalytic cracking reaction in the presence of a catalyst,
    wherein a yield of ethylene and propylene produced by the catalytic cracking reaction of the recycled C4-C5 hydrocarbons together with the thermal cracking reaction of the recycled C2-C3 paraffinic hydrocarbons is higher than the yield of ethylene and propylene produced by the catalytic cracking reaction of the naphtha and kerosene.

2. The process of claim 1, wherein the catalyst is a zeolite compound.

3. The process of claim 2, wherein the zeolite compound is ZSM-5 zeolite.

4. The process of claim 1, wherein the catalytic cracking reaction is carried out at a temperature of 500-750° C. and a naphtha or kerosene to steam weight ratio of 0.01-10.

5. The process of claim 1, wherein the catalytic cracking reaction is carried out in a fixed-bed reactor or a fluidized-bed reactor.

6. The process of claim 5, wherein, if the catalytic cracking reaction is carried out in the fixed-bed reactor, the catalytic cracking reaction is carried out at a naphtha or kerosene residence time of 0.1-600 seconds.

7. The process of claim 5, wherein, if the catalytic cracking reaction is carried out in the fluidized-bed reactor, the catalytic cracking reaction is carried out at a naphtha or kerosene residence time of 0.1-600 seconds and a catalyst to naphtha or kerosene weight ratio of 1-100.

8. A process for increasing production of light olefinic hydrocarbons from hydrocarbon feedstock by catalytic cracking, the process comprising the steps of:
    (a) feeding parrafinic naphtha or kerosene and steam into a catalytic cracking furnace where naphtha or kerosene is subjected to a catalytic cracking reaction in the presence of a catalyst;
    (b) regenerating the catalyst used in the catalytic cracking reaction by a continuous or periodic regeneration procedure and recycling the regenerated catalyst into the catalytic cracking furnace;
    (c) quenching, compressing and separating the product of the catalytic cracking reaction, to separate and recover each of hydrogen, methane and C2-C3 olefinic hydrocarbons, and to separate a stream containing C2-C3 paraffinic hydrocarbons and a stream containing C4+ hydrocarbons;
    (d) feeding the stream containing C2-C3 paraffinic hydrocarbons into a recycling furnace where it is converted to C2-C3 olefinic hydrocarbons by a thermal cracking reaction, and recycling the converted C2-C3 olefinic hydrocarbons to the quenching step (c); and
    (e) recycling the whole amount of C4-C5 hydrocarbons of the stream containing C4+ hydrocarbon to the catalytic cracking furnace wherein the recycled C4-C5 hydrocarbons are subjected to a catalytic cracking reaction in the presence of a catalyst; and
    (f) optionally recycling C6+ hydrocarbons of the stream containing C4+ hydrocarbon to the catalytic cracking furnace wherein the recycled C6+ hydrocarbons are subjected to a catalytic cracking reaction in the presence of a catalyst,
    wherein a yield of ethylene and propylene produced by the catalytic cracking reaction of the recycled C4-C5 hydrocarbons together with the thermal cracking reaction of the recycled C2-C3 paraffinic hydrocarbons is higher than the yield of ethylene and propylene produced by the catalytic cracking reaction of the naphtha and kerosene.

9. The process of claim 1, wherein a portion of a stream containing C6+ of the stream containing C4+ hydrocarbons is recycled to the catalytic cracking reaction step, and the remaining portion can be separated into a stream containing C6-C8 hydrocarbons and a stream containing C9+ hydrocarbons.

10. The process of claim 1, wherein the paraffinic naphtha or kerosene is free of olefins.

11. The process of claim 8, wherein the paraffinic naphtha or kerosene is free of olefins.

* * * * *